Oct. 27, 1925.
C. L. VAN INWAGEN
CARRIER SYSTEM
Filed Nov. 1, 1922
1,558,952
5 Sheets-Sheet 4
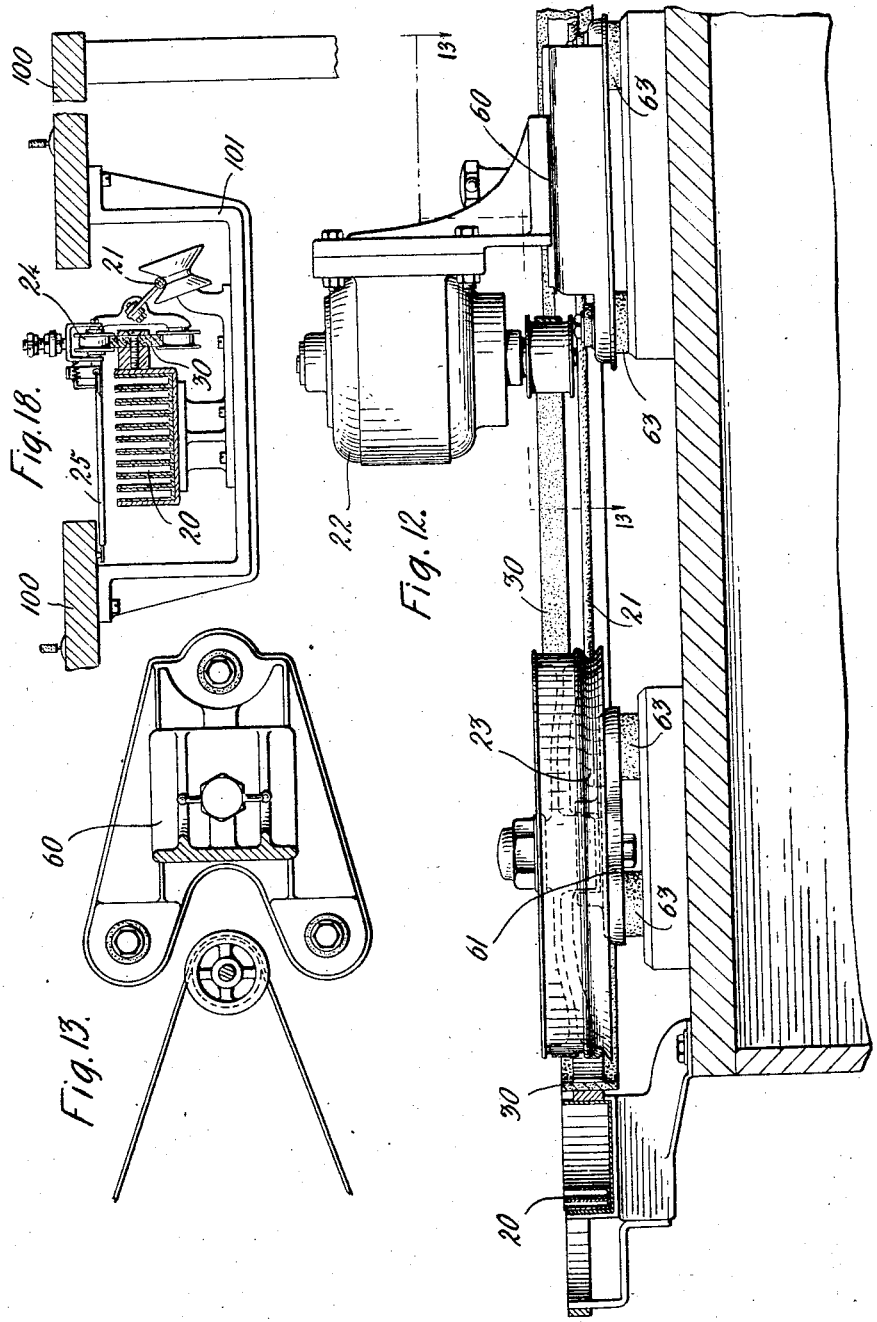
Inventor:
Charles L. Van Inwagen
by W. E. Beatty, Atty.

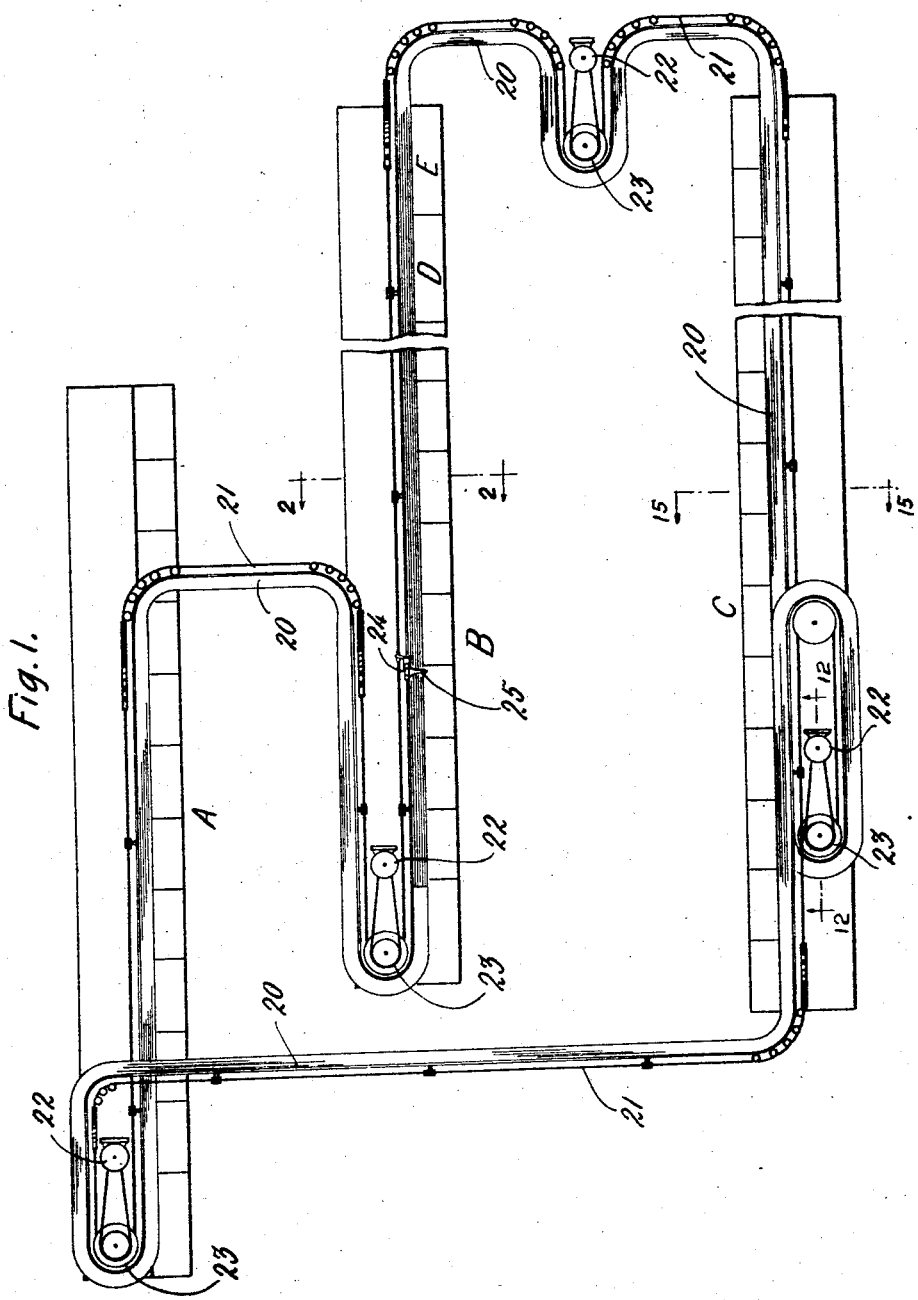

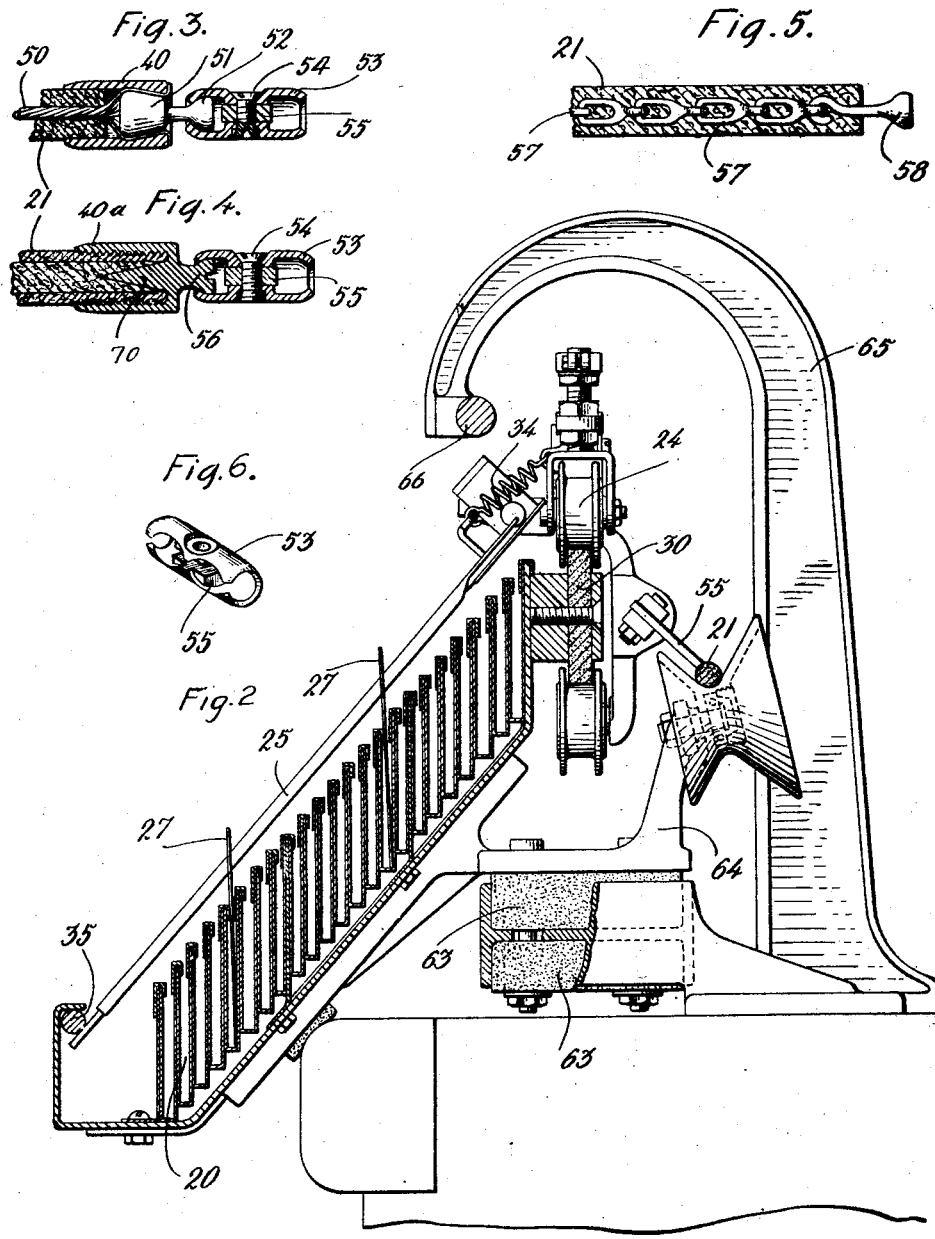

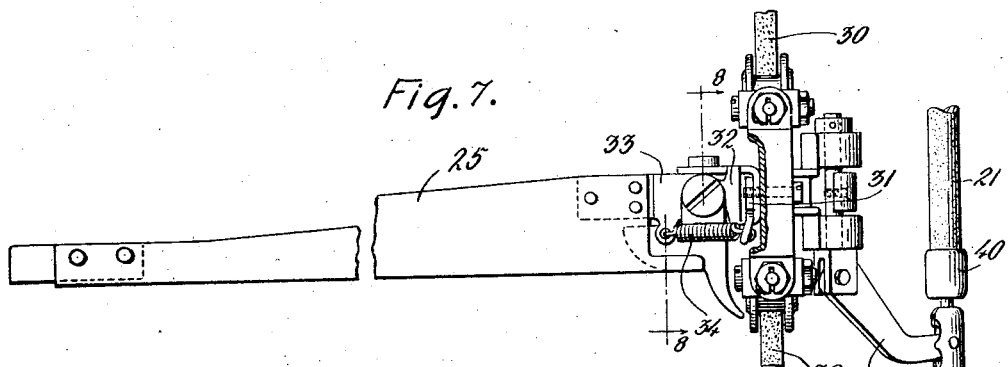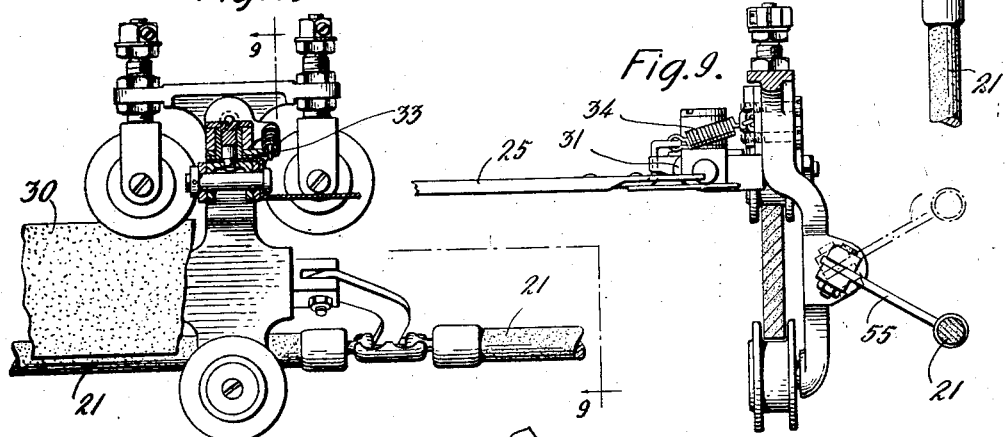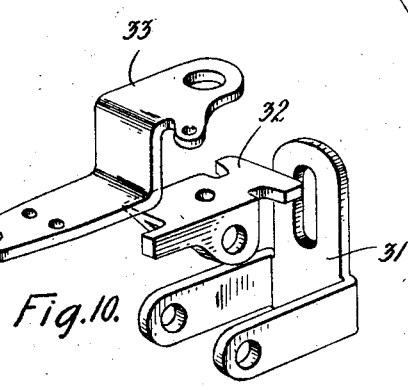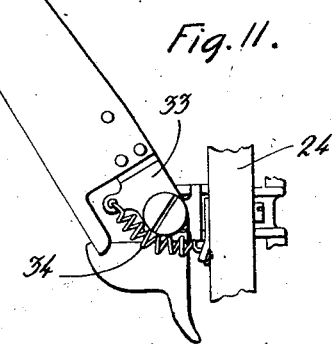

Oct. 27, 1925.  1,558,952
C. L. VAN INWAGEN
CARRIER SYSTEM
Filed Nov. 1, 1922  5 Sheets-Sheet 5
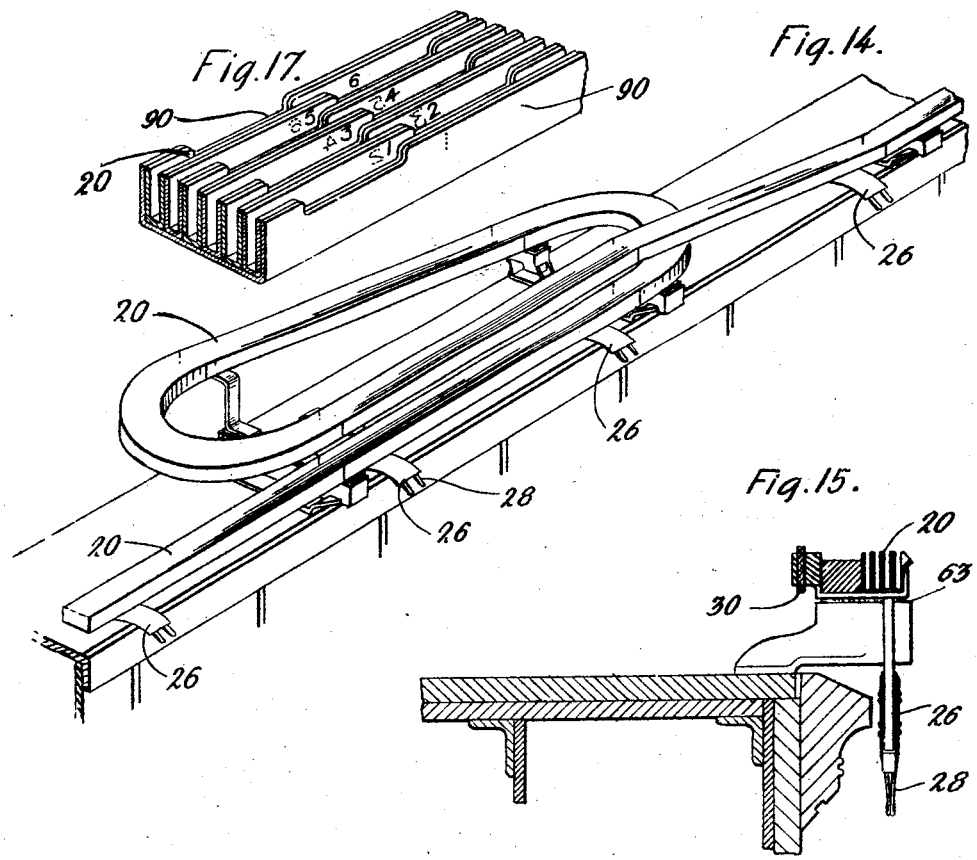
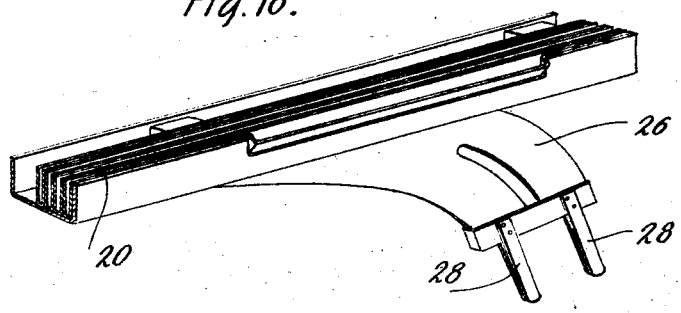
Inventor:
Charles L. Van Inwagen
by W. E. Beatty, Atty.

Patented Oct. 27, 1925.

1,558,952

UNITED STATES PATENT OFFICE.

CHARLES L. VAN INWAGEN, OF RUTHERFORD, NEW JERSEY, ASSIGNOR TO WESTERN ELECTRIC COMPANY, INCORPORATED, OF NEW YORK, N. Y., A CORPORATION OF NEW YORK.

CARRIER SYSTEM.

Application filed November 1, 1922. Serial No. 598,246.

*To all whom it may concern:*

Be it known that I, CHARLES L. VAN INWAGEN, a citizen of the United States, residing at Rutherford, in the county of Bergen, State of New Jersey, have invented certain new and useful Improvements in Carrier Systems, of which the following is a full, clear, concise, and exact description.

This invention relates to carrier systems and more particularly to carrier systems of the cable propulsion class.

The system to be described and claimed hereinafter is particularly adaptable for service in telephone exchanges. It is the usual practice in telephone exchanges to route information bearing tickets to different operators who may be called upon to establish a desired telephonic connection. The general routine in handling toll calls in an exchange is to route the calls to recording operators, whose duty it is to enter upon a ticket certain data necessary for setting up a desired connection. The ticket is then sent to a line operator, who arranges for the establishment of the desired connection and supervise it. Upon completion of the call, the line operator indicates on the ticket the time duration of the conversation, and sends the ticket to a filing clerk who inserts on the ticket information as to the cost of the call.

In order to most efficiently accomplish the dispatch of tickets from recording operators to line operators, and from line operators to file clerks, it is necessary that a system be provided wherein such tickets are carried noiselessly, with appreciable speed, and in such a manner as to cause the least distraction to the operators.

The system, in general, comprises a plurality of ticket guides in various formations adapted to receive and conduct tickets from one position to another. A trolley or carriage is provided with an extending arm which is so mechanically mounted on the trolley as to be able to associate itself with tickets in guides of any formation and sweep them to their respective destinations. The trolley itself rides on a track paralleling the guides and is coupled with an endless driving belt or cable through the instrumentality of a flexible joint which permits a limited movement between the trolley and the cable. The power for driving the cable is obtained from a plurality of motors positioned at several points in the line of travel of the cable.

It is, therefore, an object of this invention to provide improvements in a system wherein the foregoing requirements are met, and wherein a ticket is propelled in guides of different contours and different elevations.

Another object of this invention is to improve the means for permitting a relative movement between the propelling cable and the trolley associated therewith.

A further object of this invention is to provide means whereby the positioning of driving apparatus before an operator's position does not render such position inaccessible to ticket guides or delivery chutes.

Still further objects of this invention are to improve the methods and means for anchoring and coupling cables used in sysetms of the type disclosed.

The invention will be more clearly understood from the following detailed description and by reference to the accompanying drawings, in which Fig. 1 shows a plan view of the carrier system as applied to a telephone exchange; Fig. 2 is a section along line 2—2 of Fig. 1 and shows the ticket guides in banked formation and the extending arm mounted on the trolley for cooperation with tickets in the guides; Figs. 3, 4 and 5 show in section several arrangements for coupling the trolley with the driving cable whereby a relative movement is permitted between the trolley and cable; Fig. 6 is a view of the intermediate link of the cable coupling; Fig. 7 is a plan view of the trolley or carriage and the extending propeller arm and shows the method of connecting the trolley with the cable; Fig. 8 is a section along the line 8—8 of Fig. 7 looking in the direction of the arrows; Fig. 9 is a section along the line 9—9 of Fig. 8, and shows how the flexible joint functions when the trolley is in two different positions with respect to the driving cable; Fig. 10 is an isometric view of the parts employed in pivotally mounting the propeller arm on the trolley; Fig. 11 shows a section of the propeller arm in one of its operated positions; Fig. 12 is a section along the line 12—12 of Fig. 1; Fig. 13 is a section along the line 13—13 of Fig. 12; Fig. 14 is a view of a section of a switchboard with the ticket guides arranged in such a manner as to cooperate with the driving mechanism located immediately in front of an operator's position; Fig. 15 is a sectional view of a switchboard with the ticket guides in rectangular formation mounted thereon, and shows a delivery chute located at one operator's position; Fig. 16 shows a delivery chute cooperating with one of the guides in rectangular formation; Fig. 17 shows a section of ticket guides in rectangular formation provided with staggered ticket receiving slots; Fig. 18 shows an alternating arrangement whereby such a system is readily adaptable for service in an exchange employing switchboards of the flat top table type.

In the following description like numerals designate similar parts throughout the several views.

In Fig. 1 a general layout of a telephone exchange is shown wherein such a system embodying the features of this invention is particularly adaptable. A represents a low switchboard for outgoing and incoming trunk lines; B represents a recording operator's switchboard having a directory position D and a filing position E at one end; C represents a high switchboard for outgoing trunk lines. A system of ticket guides 20 interconnects the several switchboards A, B and C, and are mounted on the tops thereof. An endless belt or cable 21 runs the entire length of the system, parallel to the ticket guides and is driven at several points by a system of motors 22 and pulley wheels 23. A trolley 24 provided with a propeller arm or pusher 25 is connected to the cable 21 by means of a flexible joint connection (to be described in detail hereinafter). At various positions on switchboards A, B and C, delivery chutes 26 are provided, each of which conducts tickets from a particular ticket guide to a point within reach of the operators.

The operation of the system is as follows:

Upon the receipt of a call at the recording operator's board B, the operator handling the call records certain data on a ticket 27 and inserts the ticket in a guide which terminates in a chute 26 at the position of the operator who is to establish and supervise the desired connection. The motors 22 having been previously started, the endless cable 21 is continuously in motion and the carriage or trolley 24 associated therewith is constantly moving throughout the system. The ticket 27 remains in front of the recording operator until the propelling arm 25 associated with the trolley 24 engages it and sweeps it along its respective guide which terminates in chute 26 in front of the line operator who is to handle the call. The ticket in falling down the chute 26 engages the springs or clamping members 28 which hold the ticket in view of the operator until she is free to remove it. The line operator then removes the ticket and ascertains the nature of the desired connection and proceeds to establish it. Upon completion of the conversation the line operator records on the ticket the time duration of the call and inserts the ticket in a guide, which is common to all the operators' positions in the exchanges, and which terminates in a chute 26 at the filing position. As before, the ticket remains stationary in the guide until it is engaged by the propeller arm 25 and swept to its destination. Depending on the height of the switchboards, the chutes 26 are made long or short, so that the tickets will be within easy reach of the operators.

At ticket recording, direction and file positions, the guides are arranged in banked formation, in order to lessen the possibility of inserting a ticket in the wrong guide, whereas, in the section of the guides which interconnect the several switchboards, the guides are arranged in rectangular formation. In Fig. 17 an arrangement is disclosed whereby tickets may be easily and accurately inserted in the guides 20 when arranged in the rectangular formation. This is effected by providing the walls of each guide with staggered recesses 90, thereby permitting easy access to the various guides by the attending operator. The foregoing description gives a general idea as to the operation of the entire system, and a more specific description directed to specific details of structure follows.

The trolley 24 as shown in Figs. 2 and 8, is provided with wheels which engage with the track 30, paralleling the guides throughout their entire length. The propeller arm 25 is mounted on the trolley by means of three cooperating members 31, 32 and 33, shown in Fig. 10. The member 31 is securely fastened to the framework of the trolley 24, and is provided with two horizontal projections (assuming the trolley to be in a vertical position). The member 32 is rotatably mounted on a pin which passes through the aforesaid horizontal projections of member 31. Member 33 is provided with two horizontal projections extending in opposite directions, one of which provides means for securely mounting the arm 25 thereon, the other projection being rotatably mounted on member 32 in such a manner that the combination of all three members, when in operable relation, permits the arm 25 freedom of motion in any plane. The member 33 is also provided with a smaller projection to which one end of a spring 34 is secured, the other end of the spring being made fast to the framework of the trolley 24. This spring tends to hold the arm 25 in a horizontal position. It is to be noted that the spring 34 being located on one side of the point on which the arm 25 is pivoted, tends to maintain the arm in a normal position at right angles to the line of travel of the trolley 24.

In order that the arm 25 may cooperate with tickets in guides of various formations, a guide rod 35 is provided which slidably engages the free end of arm 25 and causes the arm to assume an operable position with respect to the guides 20 whenever these guides deviate from their rectangular formation. The guide rod 35 is present only when the arm 25 cooperates with ticket guides in banked formation, or changes from a horizontal position to a position over the guides in banked formation and vice versa. When the change (from a banked position to a horizontal position) is to be made, the spring 34 returns the arm to its normal horizontal position.

It has been found in systems of this type that in order to insure the most efficient operation of the trolley, there should be provided means whereby the trolley, though mechanically coupled to the driving belt, is permitted to move relatively thereto. The necessity for such a condition is caused by by the presence of horizontal and vertical bends in the line of travel of the trolley. The arrangement provided in this invention to effect the foregoing requirement comprises a cable coupling with an extending arm, the former being designed to co-operate with the latter in such a manner as to permit the trolley or carriage connected to the extending arm to assume any position relative to the cable as may be required by irregularities in the course of travel of the trolley.

Figs. 3, 4 and 5 show various arrangements of cable couplings and toggle joints. In Fig. 3 the belt 21 is provided with a wire cable 50 with its ends spread out in such a manner as to enclose the metallic cone 51. The free ends of the cable 50 are then turned up over the end of a sleeve 40 which is made fast to one end of the belt 21 and are soldered thereto. In this manner the free ends of the wire cable 50 are securely wedged between the inner surface of the sleeve 40 and the periphery of cone 51. A projection 52 from the cone 51 is hemispherically shaped and is designed to fit into one end of a coupling member 53. The coupling member 53 is substantially a shell or hollow cylinder which is smaller in diameter at its ends than at any other section throughout its length, and is provided with an 8-shaped slot. The shell member 53 provided with an aperture running perpendicularly to the aforesaid slot and located at the mid-point of the member 53, is adapted to receive a pin 54 on which an extending arm 55 is pivotally mounted. By the arrangement just described, the element terminating in ends 51 and 52 provides a union between the coupling member 53 and the belt 21, whereby the coupling member is free to rotate relatively to the belt. A second such element mounted in the other end of the coupling member 53, completes the connection between the two cable ends. The J-shaped extending arm 55 establishes a connection between the cable 21 and trolley 24, the ends thereof being pivotally secured to the framework of the trolley 24 and the coupling member 53. This arrangement provides means for permitting the cable 21 to function properly in driving the trolley 24, though the space between the trolley and cable does not remain uniform throughout the system.

Another arrangement of cable coupling is shown in Fig. 4. In this arrangement the shell member 40$^a$ is provided with an internal thread and has an internal cone-shaped projection 70 extending centrally and at right angles to the base of the shell, and a second screw-head projection 56 having a substantially hemispherical form. By rotating the shell member 40$^a$ on the cable 21 the cone or wedge-shaped projection 70 pierces the cable end and forces the belt material into the threads of the shell member 40$^a$, thereby effecting a slip-proof coupling. The coupling member 53 cooperates with the projection 56 in a manner similar to that described in connection with Fig. 3. In Fig. 5 a chain 57 is embedded in the cable, and on a link of the chain extending from the cable a hemispherical member 58 is attached. This member functions similarly to the projections 52 and 56 as described in connection with Fig. 3 and Fig. 4, respectively.

In systems of the type described it has been often found necessary to supply auxiliary power drives and to position them in such a manner as to create a uniform pull on the cable throughout the entire system. In arrangements heretofore in use, should such a position occur before an operator's position on a switchboard, the ticket guides would be carried away from the board at that position to make place for the motor and its necessary equipment, thereby making it impossible to provide such a position with a delivery chute for the receipt of tickets. In the present system an arrangement as shown in Figs. 1 and 14 is provided whereby intermediate motors may be inserted at any point along the system and at the same time permit the operator at such a point to receive tickets from chutes extending from the ticket guides. This arrangement requires two 180 degree turns in the ticket guides so arranged and cooperating with straight lengths of guides as to form a suitable enclosure for the necessary driving apparatus, and at the same time provide a section of ticket guides in operable relation with a delivery chute at such a point.

It is necessary to so arrange a system of this type that the noise created by the moving parts will not be intensified by the switchboard acting as a sounding board. In the present system all brackets, such as 60, 61 and 62, on which moving parts are mounted, are separated from the switchboard by pads 63 of felt, or other like material, which act as sound insulators.

The inverted J-shaped bracket 65 shown in Fig. 2 carries a guard rail 66. Should the trolley leave the track it would tend to fall towards the front of the board due to the increased tension in spring 34 acting on the arm 25, and possibly injure the attending operator. In order to obviate this danger, the guard rail 66 is provided throughout the system, and in the event of a trolley leaving the track the rail would check the fall of the trolley.

In Fig. 18 another adaptation of the system described herein is disclosed. In some exchanges it may be advisable to provide flat top table switchboards, particularly at the recording operator's positions, and in order to provide for the efficient distribution of tickets between operators at such positions the switchboard 100 is centrally divided lengthwise, and a mounting frame 101 unites the two sections. The ticket guides 20 and track 30 are provided with mounting brackets similar to those employed in connection with the high type switchboards as shown in Fig. 2. As shown in Fig. 18, the guides are accessible to the operators on both sides of the switchboard and the location of the guides insures correct insertion of tickets therein.

What is claimed is:

1. In a ticket distributing system, a ticket guide having a spiral turn therein, so that portions thereof are in superposition to other portions of the guide, a chute leading from said guide, an endless cable paralleling said ticket guide, means associated with said cable for moving a ticket in said guide and depositing it in said chute, and a motor and pulley system in association with said cable and located within said spiral turn.

2. In a ticket distributing system, a plurality of receiving stations having upper and lower levels, a plurality of ticket guides interconnecting said stations and having a plurality of spiral turns so that some of said guides may be in superposition to other guides of the system at any of said stations, means associated with said guides for moving a ticket therein, and motive means situated within said spiral turns to actuate said first means.

3. In a conveying system, an article to be conveyed, a guide having two 180° turns therein, a belt for conveying said article in said guide, and motive means located within said turns for driving said belt.

4. A method of conserving space in a ticket distributing system which consists in placing a plurality of 180° turns in the guides thereof and locating motive means for the system within said turns.

5. In a conveying system wherein an article is to be conveyed along a guide by an arm attached to an endless belt paralleling the said guide, the method of maintaining a uniform strain on all portions of the said belt which consists in applying stress to said belt at a plurality of regular intervals in the length thereof.

6. In a conveying system, an article to be conveyed, a guide having a loop portion wherein the guide passes from its normal to an abnormal level and returns to its normal level, portions of said guide being situated above other portions thereof, and motive means within said loop portion for conveying said article in said guide.

7. In a ticket distributing system, a plurality of ticket guides having staggered recesses therein for the reception of tickets.

8. In a ticket distributing system, a plurality of ticket guides having their walls parallel and recessed at certain intervals to permit the easy insertion of tickets therein.

9. In a ticket distributing system, a guide formed by two vertical walls, one of said walls recessed at a point to cooperate with the other wall to form a ticket receptacle at that point.

10. In a ticket distributing system, a plurality of guides having vertical walls, each of said walls recessed at various points to cooperate with an adjacent wall to form a ticket receptacle.

11. In a ticket distributing system, a plurality of ticket guides looped to form different contours and elevations, an endless cable paralleling said guides, means for moving said cable, a carriage for moving tickets along said guides, a track for said carriage paralleling the cable, and a coupling means between said cable and carriage arranged to permit a limited relative movement between these parts while the carriage travels along the various contours and elevations of the track.

12. In a ticket distributing system, a plurality of ticket guides looped to form different contours and elevations, an endless cable paralleling said guides, means for moving said cable, a carriage for moving tickets along said guides, a track for said carriage paralleling the cable, a coupling means between said cable and carriage comprising a member rotatably mounted on the cable, and a link flexibly connected to said member and to said carriage so that the carriage may adjust itself in relation to the position of the cable while passing along the different contours and elevations of the guide.

13. In a ticket distributing system, a plurality of ticket guides looped to form different contours and elevations, an endless cable paralleling said guides, means for moving said cable, a carriage for moving tickets along said guides, a track for said carriage paralleling the cable, and a coupling means between said cable and carriage comprising a member rotatably mounted on the cable and a link mounted on said carriage to move in two directions and connected to said member to move rotatably therein in a direction parallel with the cable so that this link may assume any position relative to the cable and carriage as may be required by irregularities in the course of travel of the carriage along the various contours and elevations as compared with the course of travel of the cable.

14. In a ticket distributing system, a plurality of ticket guides looped to form different contours and elevations, an endless cable paralleling said guides, means for moving said cable, a carriage for moving said tickets along said guides, a track for said carriage paralleling the cable, a coupling means between said cable and carriage, and resilient means for absorbing vibrations caused by the travel of the movable parts of said system.

15. In a ticket distributing system, a plurality of ticket guides looped to form different contours and elevations, an endless cable paralleling said guides, means for moving said cable, a carriage for moving said tickets along said guides, a track for said carriage paralleling the cable and attached to the guides, a coupling means between said cable and carriage, and means for absorbing vibrations caused by the parts of said system during any movement thereof.

16. In a conveying system, an article guide, an endless belt paralleling said guide and arms on said belt arranged to sweep over said guide, a plurality of natural turning points in said guide and belt, artificial turning points located in straight runs of said guide and belt, said natural turning points and said artificial turning points being constructed and arranged at regular intervals along the length of said guide and belt and means located at said regularly disposed turning points for applying stress to said belt.

In witness whereof, I hereunto subscribe my name this 26th day of October A. D., 1922.

CHARLES L. VAN INWAGEN.